Oct. 14, 1952     W. A. CHAPMAN     2,613,802

CONVEYER IDLER

Filed July 26, 1947

INVENTOR.

BY WILLIAM A. CHAPMAN

ATTORNEY

Patented Oct. 14, 1952

2,613,802

UNITED STATES PATENT OFFICE 2,613,802

CONVEYER IDLER

William A. Chapman, Lithonia, Ga.

Application July 26, 1947, Serial No. 763,956

2 Claims. (Cl. 198—192)

This invention relates to conveyors and more particularly to a flexible resilient conveyor idler.

It is common practice to transport or carry pulverized or semi-pulverized materials, such as rock for example, on continuous conveyor belts operating in conjunction with a plurality of idlers, the most common type of which comprises a series of three iron rolls, suitably supported and provided with anti-friction bearings, the two outside rolls being elevated at their ends so as to provide an over-all trough-like arrangement and make possible the transporting of larger quantities of material than would be possible if a strictly horizontal conveyor surface was present. Return idlers are usually positioned beneath the main members, and out of contact therewith, the return elements being of unitary construction and straight contour, since they do not carry any appreciable load, other than the empty belt, being more in the nature of guides.

Devices of the above type, while widely used have a number of drawbacks, chief of which is their cost of manufacture, since they have an appreciable number of parts requiring considerable material; and in the face of high labor and other costs present a definite problem in this field. Another objection to conventional devices of this type lies in the fact that, due to their somewhat awkward upper contour, they tend to wear out belts at a fairly rapid rate, the points where the rollers adjoin each other and form a sharp angle with each other, providing particularly bad wearing surfaces.

There also exists some problem in securing uniformity of traction in these devices, since the upper set of rollers is substantially burdened in operation, and the underneath or return idlers carry little but the weight of the belt thereon, which condition results in some unbalance, and lack of smoothness in the over-all operation.

An object of my invention is to produce a flexible, resilient conveyor idler, which may be manufactured at relatively low cost.

Another object is to provide for uniformity of belt wear in such a device, thereby still further decreasing costs.

Another object is to provide an idler which is simple in structure, and with a minimum of parts.

Another object is to provide shock absorbing properties in a device of the instant type.

A still further object is to provide a device which automatically adjusts itself to the weight of a given load.

Another object is to provide a conveyor idler and return idler so constructed and positioned that one aids in supporting the other.

Another object is to provide smoothness of operation in a device of the instant type.

Another object is to provide an idler which is efficient in operation, and thoroughly adapted for its intended purposes.

These and other objects made apparent during the further progress of this specification, are effected by means of my improved conveyor idler and return idler, a full and complete understanding of which is facilitated by reference to the drawing herein, in which.

Figure 3:
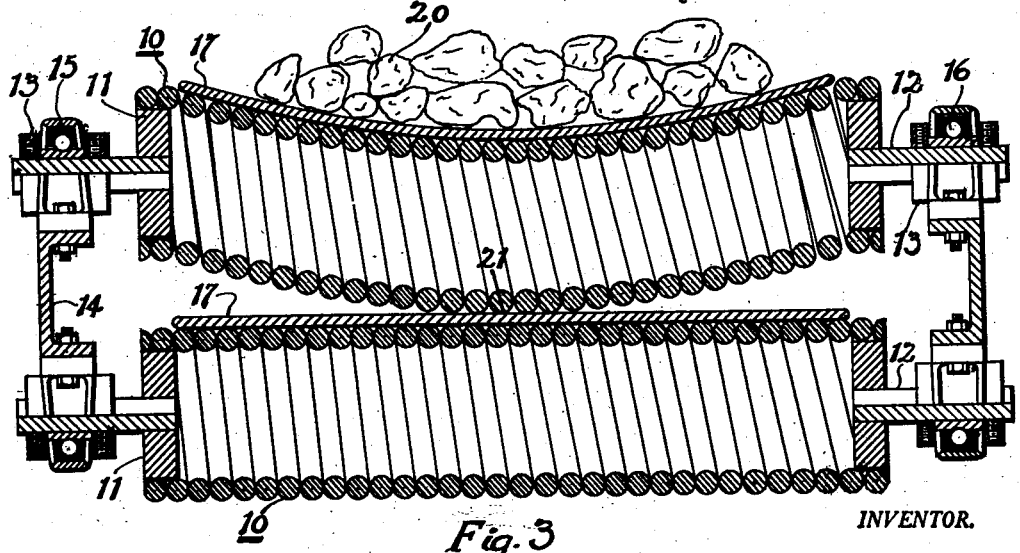
Fig. 3 is a view in transverse vertical cross-section, showing in detail the various elements which comprise the instant device.

Referring now to the drawings, Fig. 3, it will be seen that my conveyor idler consists of a pair of rollers 10, which are formed from tightly coiled spring steel, and which are, in effect, powerful coil springs. The ends of rollers 10 are secured to rotatable hubs 11 which are welded or otherwise rigidly affixed to shafts 12, which are supported by collars 13, securely anchored on a supporting frame 14. Sockets 15 form a race for ball bearings 16, which anti-friction arrangement makes possible free and effortless rotation of flexible rollers 10, operating through shafts 12. A flat belt 17 is positioned on and associated with said rollers in such a manner that the upper surface of said belt constitutes a conveying media when loaded, and the lower segment of the belt a return element, this relative position of course progressively changing with the movement of the belt.

Figure 1:
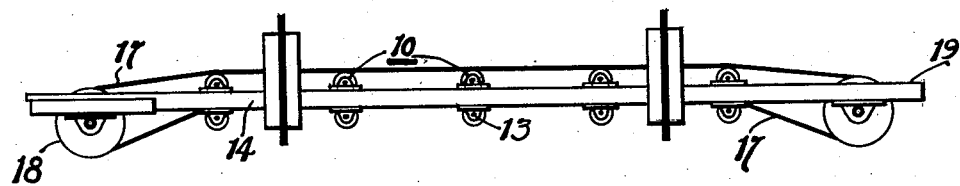
Fig. 1 is a side view of the entire assembled conveyor.
Figure 2:
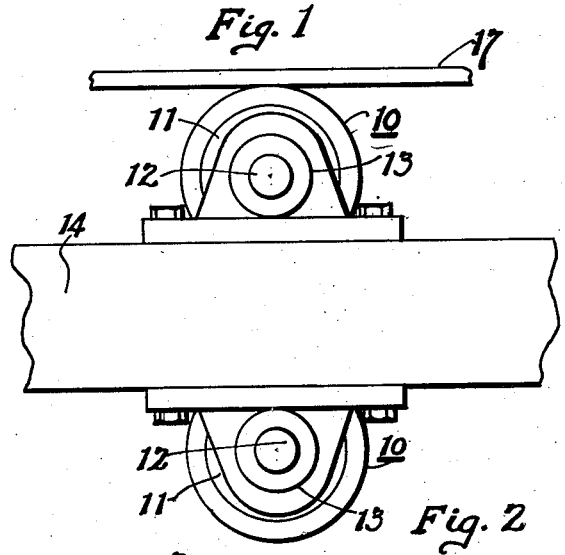
Fig. 2 is an enlarged side view, fragmentary in part, showing my conveyor idlers.

In Fig. 1, there is illustrated a short conveyor assembly in which the idlers are spaced at intervals of approximately 40", it being apparent that material to be carried may be placed at one end of the assembly, and upon power being applied to belt 17, as at drive pulley 18 for example, the belt moves forward and ultimately discharges its burden at the opposite end 19 of the device.

Particular attention is now directed to the specific manner in which my idler adapts itself to the exigencies of a given load, it being apparent from the drawing (Fig. 3) that top roller 10 under the weight of a load 20 tends to distort downwardly from its ends, and belt 17 in turn adapts itself to the contour of the roller at this time, there then being formed a trough-like surface which permits the transportation of a maximum amount of material. It is further apparent that this distortion is a simple, uniform and natural one, which in turn means that the belt wears uniformly, there being no sharp bends or critical wear points as in the case of devices now in use.

Of particular importance is the fact that the steel spring, while forming rolls 10, is tightly coiled, in contrast to certain devices of the prior art which disclose an open coil, and which were apparently inoperative for this reason. My device possesses sufficient rigidity to do a thorough and complete conveying job, yet it possesses desired flexibility, as described above.

Attention is now directed to the manner in which the bottom return idler is positioned with reference to the upper roller, it being desirable that said first mentioned element be disposed in such proximity to said second element, that when fully loaded, said upper roller actually contacts the return belt, as at 21. The extent and degree of this contact will vary somewhat with the load being carried, but in the optimum operation of my device, this contact is present to such an extent as to provide frictional engagement between the return belt and the said upper roller, thereby effecting a balanced movement of the rolls, in contrast to the conventional arrangement in which the lower element is an idler in the full sense of the word, while the upper roller is simultaneously heavily burdened, the contrast in the load-strain of these two adjacent elements setting up an undesirable mechanical condition. It will be noted that in my device, the return belt to some extent powers the upper roller and helps support the top roller; the over-all movement being a smooth and controlled one. In addition, the lower rollers, under heavy loads will tend to assume the same contour as the upper ones, there being thus provided at such times what amounts to double conveyor idlers, with added strength and flexibility.

Finally, it will be noted that by virtue of the flexible resilient structure of the instant conveyor idler, important shock absorbing properties are inherent in my device. Heretofore, in handling heavy materials such as large rocks, for example, it has been necessary or desirable to provide supplemental shock absorbing means in conveyor structures, since the impact of these heavy objects on a rigid assembly results in extensive damage and wear thereto. In the case of my idler, however, which is in effect a heavy spring in itself, these shock absorbing characteristics are automatically furnished, which means that heavy loads are handled in an efficient manner with a minimum of wear to the over-all assembly.

From the foregoing, it will be apparent that I have shown and described a new and improved conveyor assembly in which a tightly coiled upper roller automatically conforms itself to the weight of a load, and carries a belt in such a manner as to eliminate wear points, and to provide for uniform wear in the belt. That my device is resilient and flexible, these factors still further reducing wear. That my said invention is simple in its structure, economical to manufacture, and formed with relatively few parts, as contrasted to other devices in this field. That by associating the lower roller and return belt with the upper roller in the manner described herein, additional advantages of smoothness and positive operation result.

While I have described my invention in some detail herein, with particular reference to one form or embodiment thereof, I do not intend to limit myself thereby, but on the contrary, it is apparent to one skilled in the art that various changes, additions, modifications, alterations and reconstructions of my device may be resorted to without departing from the appended claims, which are to be fairly construed in keeping with my contribution to the art.

I claim:

1. In a device of the character described, a supporting frame, a conveyor belt associated therewith, and a pair of oppositely disposed resilient rollers consisting of tightly coiled springs, rotatably mounted on said frame in such a manner that when the upper roller is loaded, it is in frictional engagement with said lower roller through said belt, the lower roller progressively conforming to the contour of said upper roller as weight is added thereto.

2. In a belt-troughing idler structure, supporting means, and a plurality of oppositely disposed idler members rotatably mounted thereon, said idler members being formed from tightly coiled springs; and a conveyor belt operatively disposed on the tops of said rollers, whereby when the upper rollers are distorted under a load, they are in frictional engagement with said conveyor belt, as such is traveling on the lower rollers at that time, said lower rollers progressively conforming to the contour of the upper members with the addition of weight thereto.

WILLIAM A. CHAPMAN.

REFERENCES CITED

The following references are of record in the file of this patent:

UNITED STATES PATENTS

| Number | Name | Date |
|---|---|---|
| 842,813 | Ridgeway | Jan. 29, 1907 |
| 857,771 | Thomas | June 25, 1907 |

FOREIGN PATENTS

| Number | Country | Date |
|---|---|---|
| 329,132 | Great Britain | May 15, 1930 |
| 496,987 | Great Britain | Dec. 9, 1938 |
| 672,218 | Germany | Feb. 22, 1939 |
| 836,026 | France | Oct. 10, 1938 |